(12) United States Patent
Krappe et al.

(10) Patent No.: US 10,482,160 B2
(45) Date of Patent: Nov. 19, 2019

(54) SOCIAL MEDIA INTEGRATION AND COLLABORATION TOOLS IN A SYSTEM FOR LINKING STRUCTURED DATABASE MANAGEMENT SYSTEMS WITH DOCUMENT CREATION AND WORD PROCESSING TOOLS

(71) Applicant: APTTEX CORPORATION, San Mateo, CA (US)

(72) Inventors: Kirk Krappe, Portola Valley, CA (US); Neehar Giri, Saratoge, CA (US)

(73) Assignee: APTTEX CORPORATION, San Mateo, CA (US)

( * ) Notice: Subject to any disclaimer, the term of this patent is extended or adjusted under 35 U.S.C. 154(b) by 0 days.

(21) Appl. No.: 16/145,605

(22) Filed: Sep. 28, 2018

(65) Prior Publication Data

US 2019/0034387 A1 Jan. 31, 2019

Related U.S. Application Data

(63) Continuation of application No. 13/423,283, filed on Mar. 19, 2012, now Pat. No. 10,146,742.

(51) Int. Cl.
| | | |
|---|---|---|
| *G06F 17/21* | (2006.01) | |
| *G06F 17/24* | (2006.01) | |
| *G06Q 50/00* | (2012.01) | |
| *G06Q 10/10* | (2012.01) | |
| *G06F 16/93* | (2019.01) | |

(52) U.S. Cl.
CPC ............ *G06F 17/211* (2013.01); *G06F 16/93* (2019.01); *G06F 17/24* (2013.01); *G06Q 10/101* (2013.01); *G06Q 50/01* (2013.01)

(58) Field of Classification Search
CPC .................................................... G06F 17/211
See application file for complete search history.

(56) References Cited

U.S. PATENT DOCUMENTS

| | | | |
|---|---|---|---|
| 8,615,557 B2 | 12/2013 | Swink et al. | |
| 9,129,255 B2 * | 9/2015 | Toussaint et al. | ...... G06F 9/445 |
| 2006/0178956 A1 | 8/2006 | Von Zimmermann et al. | |
| 2008/0189655 A1 | 8/2008 | Kol | |
| 2008/0244091 A1 | 10/2008 | Moore et al. | |
| 2009/0132349 A1 | 5/2009 | Berkley et al. | |
| 2010/0241971 A1 | 9/2010 | Zuber | |
| 2010/0293503 A1 | 11/2010 | Toussaint | |

(Continued)

OTHER PUBLICATIONS

Bonchi et al., "Social Netwrok Analysis and Mining for Business Applications",2011, ACM, pp. 1-37.

*Primary Examiner* — James J Debrow
(74) *Attorney, Agent, or Firm* — HM Law Group LLP; Vani Moodley, Esq.

(57) ABSTRACT

Computer architecture including an add-in for linking document creation application with a cloud-based structured database management system and for and integrating a social network media feeds. Integrating social network media feeds and calibration tools into a word processing application linked with a contract creation and contract lifecycle management application. Integrating social network media feeds and calibration tools of a social network that runs on the same platform as the structured database management system and that shares log-in credentials with the structured database management system.

20 Claims, 9 Drawing Sheets

(56) References Cited

U.S. PATENT DOCUMENTS

| | | |
|---|---|---|
| 2011/0145153 A1 | 6/2011 | Dawson et al. |
| 2011/0209049 A1 | 8/2011 | Ghosh et al. |
| 2012/0173969 A1 | 7/2012 | Schmid |
| 2012/0226759 A1 | 9/2012 | Lew |
| 2013/0132927 A1 | 5/2013 | Karft |
| 2013/0304822 A1 | 11/2013 | Tetreault |

* cited by examiner

SOCIAL MEDIA INTEGRATION AND COLLABORATION TOOLS IN A SYSTEM FOR LINKING STRUCTURED DATABASE MANAGEMENT SYSTEMS WITH DOCUMENT CREATION AND WORD PROCESSING TOOLS

BACKGROUND OF THE INVENTION

Technical Field

The invention relates to the field of business management. More specifically, the invention relates to using structured data in a document creation application and integrating a social network media feeds.

Description of the Related Art

The increased availability of computer systems and the ability to connect the computer systems using various networks such as intranets and the Internet, for example, has made vast repositories of information and cloud-managed software applications available to a large number of people. In many instances, having such a large amount of information at one's fingertips greatly enhances productivity.

These advances in information accessibility and processing have created other challenges, e.g., how to manage such a large collection of information. Many new tools have been developed to deal with the ever-expanding volume of information that is now available for consumption in an electronic form.

Some approaches to managing vast amounts of information utilize a structured database management system. Indeed, it is highly useful to access a structured database management system and run applications thereon, i.e. applications for managing customer or partner engagement, managing the contract process/lifecycle, and for automatically generating documents.

However, despite the ability to manage business relationships through an application with access to a structured database management system, most business relationships are memorialized using word processing software and managed by manual human analysis.

Social media technology has substantially changed the ways that individuals and organizations communicate, share, and collaborate. However, despite the ubiquity of social media applications in browser-based applications, their reach does not adequately pervade into other collaborative applications.

SUMMARY OF THE INVENTION

In view of the foregoing, the invention provides systems and methods of linking structured database management systems with document creation tools. Some embodiments of the invention involve a computer architecture including an add-in for linking document creation application with a cloud-based structured database management system and for and integrating a social network media feeds.

Some embodiments of the invention involve tools for allowing the user of a document creation application to access cloud-based contract creation, and management utilities as well as social media feeds and tools without ever leaving the document interface itself.

Some embodiments of the invention involve integrating social network media feeds and calibration tools into a word processing application linked with a business lifecycle management application configured for creating a quote for a plurality of customers, engaging and negotiating an agreement, managing customer orders, and invoicing customers.

Some embodiments of the invention involve integrating social network media feeds and calibration tools into a word processing application linked with a contract creation and contract lifecycle management application.

Some embodiments of the invention involve integrating social network media feeds and calibration tools of social network external to the structured database management system. Some embodiments of the invention involve integrating social network media feeds and calibration tools of a social network that runs on the same platform as the structured database management system and that shares log-in credentials with the structured database management system.

Some embodiments of the invention involve integrating social network media feeds that include user profile information, static information relating to theirs or other users' interests, multimedia information relating to theirs or other users' interests, an interface for entering text, objects, or a combination of text and objects, information relating to a document open in said document creation application, information relating to the document as a whole, information relating to a selected portion of text in a document open in said document creation application, and a combinations thereof.

DETAILED DESCRIPTION OF THE INVENTION

Systems and methods are provided for utilizing the Web Services Description Language of one or more structured database management system to communicate with a business management application. In some embodiments of the invention, the business management application is accessed using an API call from a document creation application. In the presently preferred embodiments of the invention, the document creation application comprises a word processing application; however, those with ordinary skill in the art having the benefit of the disclosure will appreciate that the invention can also be implemented in a wide variety of applications for creating documents, graphs, images, presentations, videos, etc. with the same effectiveness.

In some embodiments of the invention the business management application comprises a business lifecycle management application for creating a quote for a prospect or customer, engaging and negotiating an agreement, order management and invoicing. In the presently preferred embodiments of the invention, a contract creation and contract lifecycle management application accesses a cloud-based structured database management system via an add-in for a word processing application. Although a cloud-based structured database management system is explicitly described, those with ordinary skill in the art having the benefit of the disclosure will appreciate that the invention can also be implemented in a behind firewall database management system with the same effectiveness.

Figure 1:
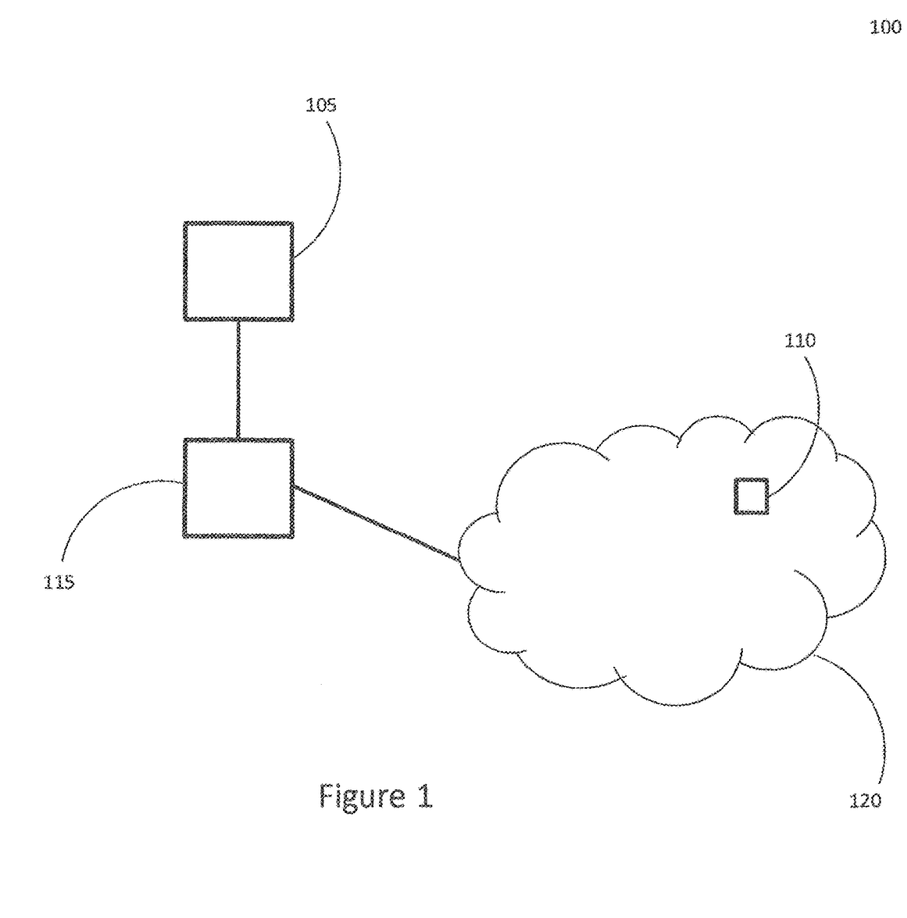
FIG. 1 illustrates an example of architecture for providing a document creation application with access to business management application according to some embodiments of the invention.

FIG. 1 illustrates an example of architecture 100 for providing a document creation application 105 with access to business management application 110 according to some embodiments of the invention. According to FIG. 1, the business management application 110 is hosted on a cloud-based structured database management system 120. In some embodiments of the invention, the cloud-based structured database management system 120 comprises a platform-as-a-service offering, such as those offered by Salesforce®, located at One Market Plaza, Suite 300, San Francisco, Calif., 94105, United States.

According to FIG. 1, the business management application 110 is accessed by the document creation application 105 through a managed add-in 115 that transfers web service calls to the business management application 110 via the structured database management system 120. Accordingly, a user accesses structured data from the structured database management system 120 as well as the business management application's 110 functionality via the document creation application 105.

In most cases, the business management application 110 and the structured database management system 120 require log-in credentials. In some cases, the log-in credentials are the same for both the business management application 110 and the structured database management system 120. In the presently preferred embodiment of the invention, a user enters his structured database management system 120 log-in credentials via the document creation application 105.

In some embodiments of the invention, once the user logs into the document creation application 105 using his structured database management system 120 credentials, a session identifier is stored within the add-in 115 so that successive calls can be invoked in the same session context until the user logs out of the system.

In some embodiments of the invention, the add-in is configured to display interactive menus, buttons, text fields, etc. either via windows native to the document creation application 105, browser-based windows common to the structured database management system 120, or a combination thereof.

In some embodiments of the invention, a browser-based form loads a dynamic interactive page from the business management application 110 in the structured database management system 120. In one illustrative example, a browser-based form loads a dynamic interactive Visualforce® page from a contract lifecycle management product in the Salesforce.com cloud. According to this example, the browser-based form helps the customer to extend or improvise the Visualforce® page according to their organizational needs, thereby enabling zero maintenance on the deployment of the add-in 115 on each of the organization users' desktops.

In some other embodiments of the invention, the add-in 115 is configured to display interactive menus, buttons, text fields, etc. via the document creation application 105 itself.

According to some embodiments of the invention, business management application 110 comprises a contract management application designed for contract administrators and legal users to help streamline the process of creating and maintaining contracts and associated contract and clause templates. Since these users are familiar with drafting, revising, and negotiating contracts using common word processing software, it is desirable to offer the benefits and functionality of the contract management application from within the native word processing environment. Using the contract management application, contract administrators can manage complex negotiation cycles, clauses, and contract templates easily.

As explained above, social media technology has substantially changed the ways that individuals and organizations communicate, share, and collaborate. Indeed, using social media technology is an effective way to manage business relationships. Accordingly, it is an object of the invention to integrate social media technology into a business management application 110 is accessed by the document creation application 105 through a managed add-in 115 and that has access to a structured database management system 120.

Figure 2A:
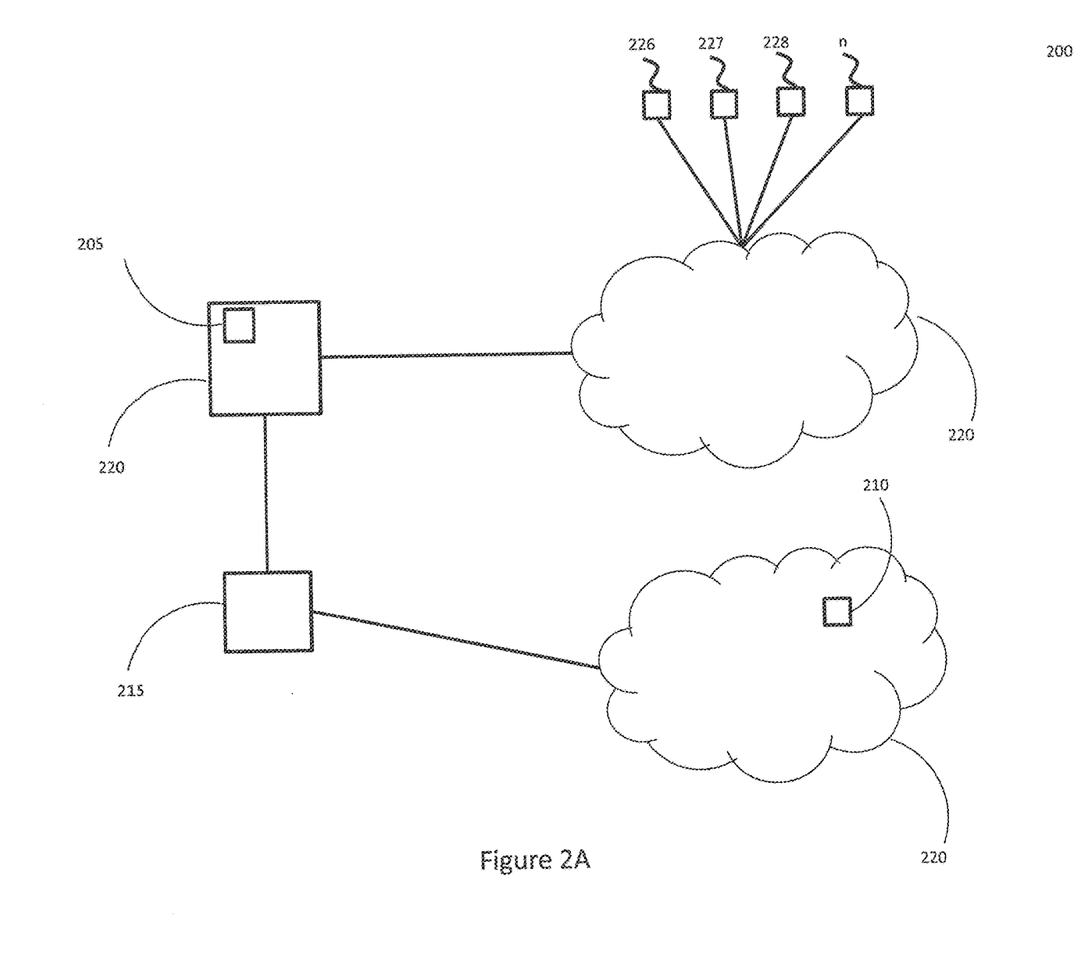
FIG. 2A illustrates an example of architecture for providing a document creation application with access to business management application as well as a social media network according to some embodiments of the invention.

FIG. 2A illustrates an example of architecture 200 for providing a document creation application 205 with access to business management application 210 as well as a social media network 230 according to some embodiments of the invention. The business management application 210 is hosted on a cloud-based structured database management system 220. The business management application 210 is accessed by the document creation application 205 through a managed add-in 215 that transfers web service calls to the business management application 210 via the structured database management system 220.

In some embodiments of the invention, the document creation application 205 is run on a client computer 225 that is connected to a plurality of other client computers 226, 227, 228, . . . , n via an external network 230. In some other embodiments of the invention, the client computer 225 is connected to other client computers via the cloud-based structured database management system 220 itself.

Figure 2B:
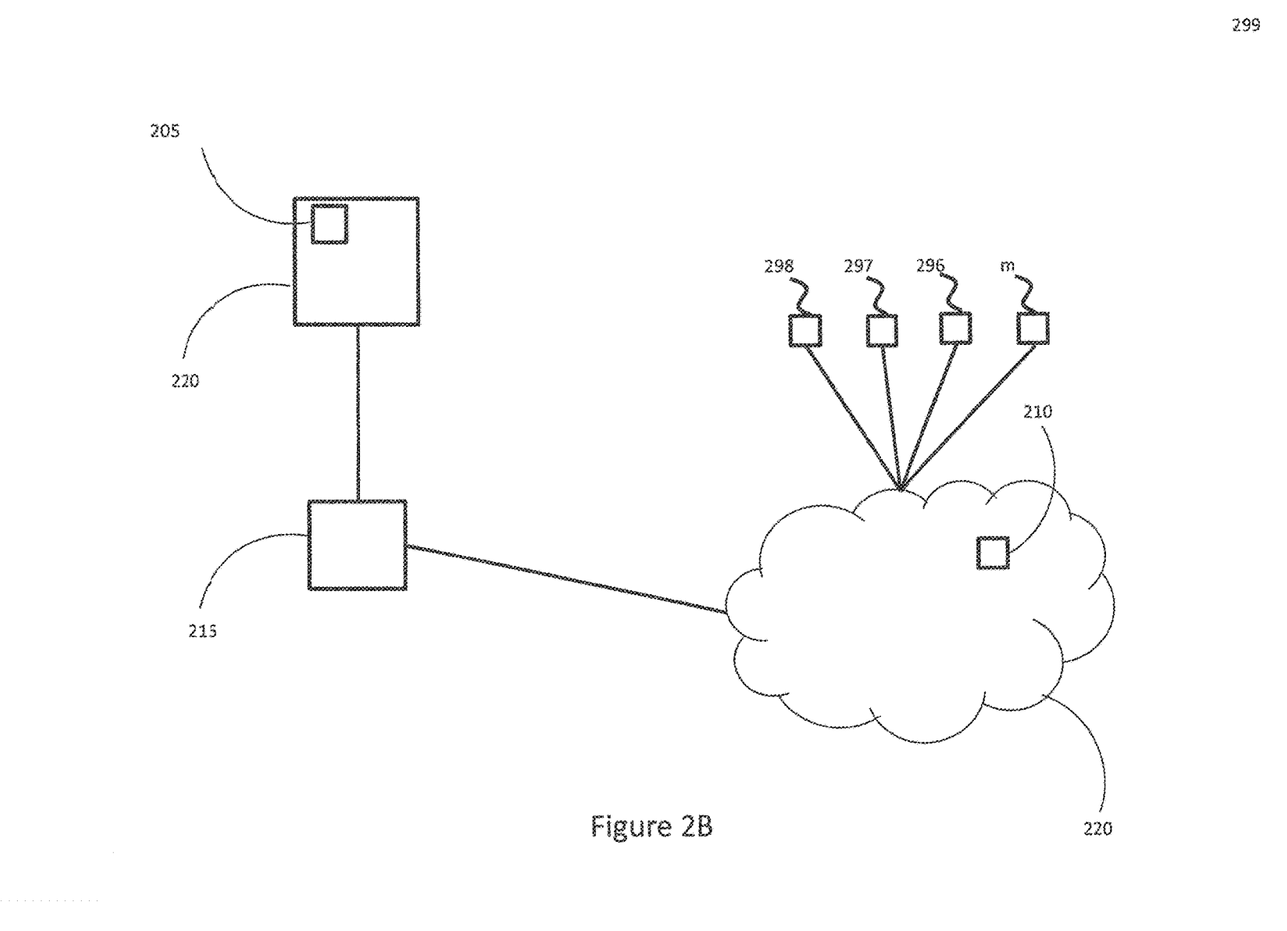
FIG. 2B illustrates an example of architecture for providing a document creation application with access to business management application as well as to a plurality of other client computers via the cloud-based structured database management system itself according to some embodiments of the invention.

FIG. 2B illustrates an example of architecture 299 for providing a document creation application 205 with access to business management application 210 as well as to a plurality of other client computers 298, 297, 296, . . . , m via the cloud-based structured database management system 220 itself according to some embodiments of the invention.

Figure 3A:
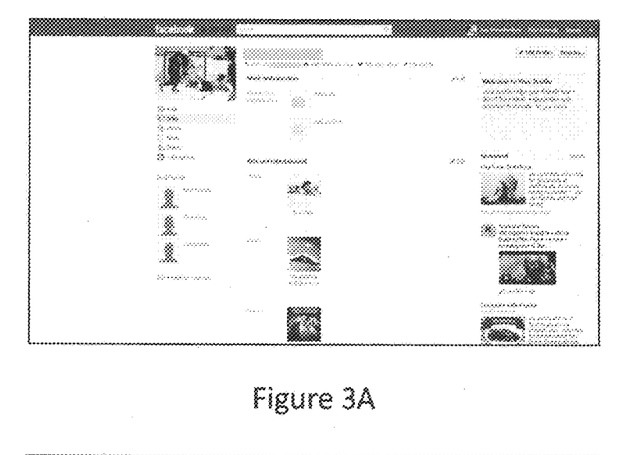
FIG. 3A illustrates a browser-based social media network interface.
Figure 3B:
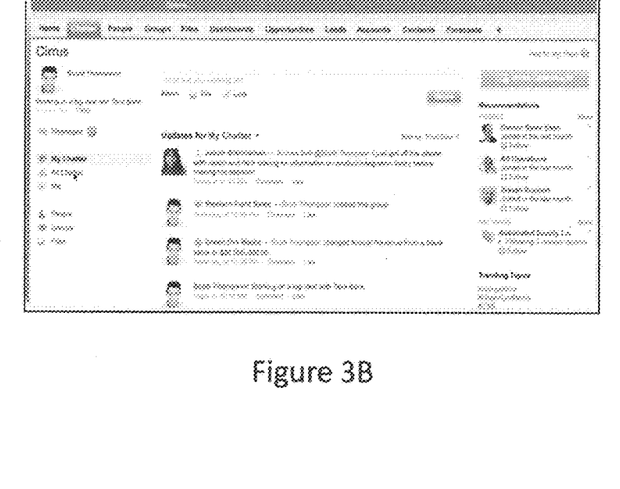
FIG. 3B illustrates a browser-based social media network interface.

Before the invention, social media network interfaces were most-commonly browser-based, such as those shown in FIGS. 3A and 3B. Users could flag other users in photos and comments and they could exchange real-time messages; however, social media networks were disconnected from other business management activities and applications. Accordingly, in the presently preferred embodiments of the invention, the document creation application 205 itself incorporates a social media interface.

In some embodiments of the invention, the business management application 210 add-in 215 integrates a social media interface directly inside a word processing document. The business management application 210 add-in 215 also allows users to share content or agreement document via the social media network.

According to these embodiments, the user has the ability to access a plurality of social media. For example, a user can view the user's general media feed or switch the view to see media feeds that are specific to the currently opened agreement document or to a selected portion thereof.

In the presently preferred embodiments of the invention, the social media network is built on the cloud-based structured database management system 220 platform. For example, the business management application 210 add-in 215 loads the social media network built on the cloud-based structured database management system 220 platform in a native word processing task pane providing an ability to perform a side-by-side view of the agreement document and social media feed.

Figure 4A:
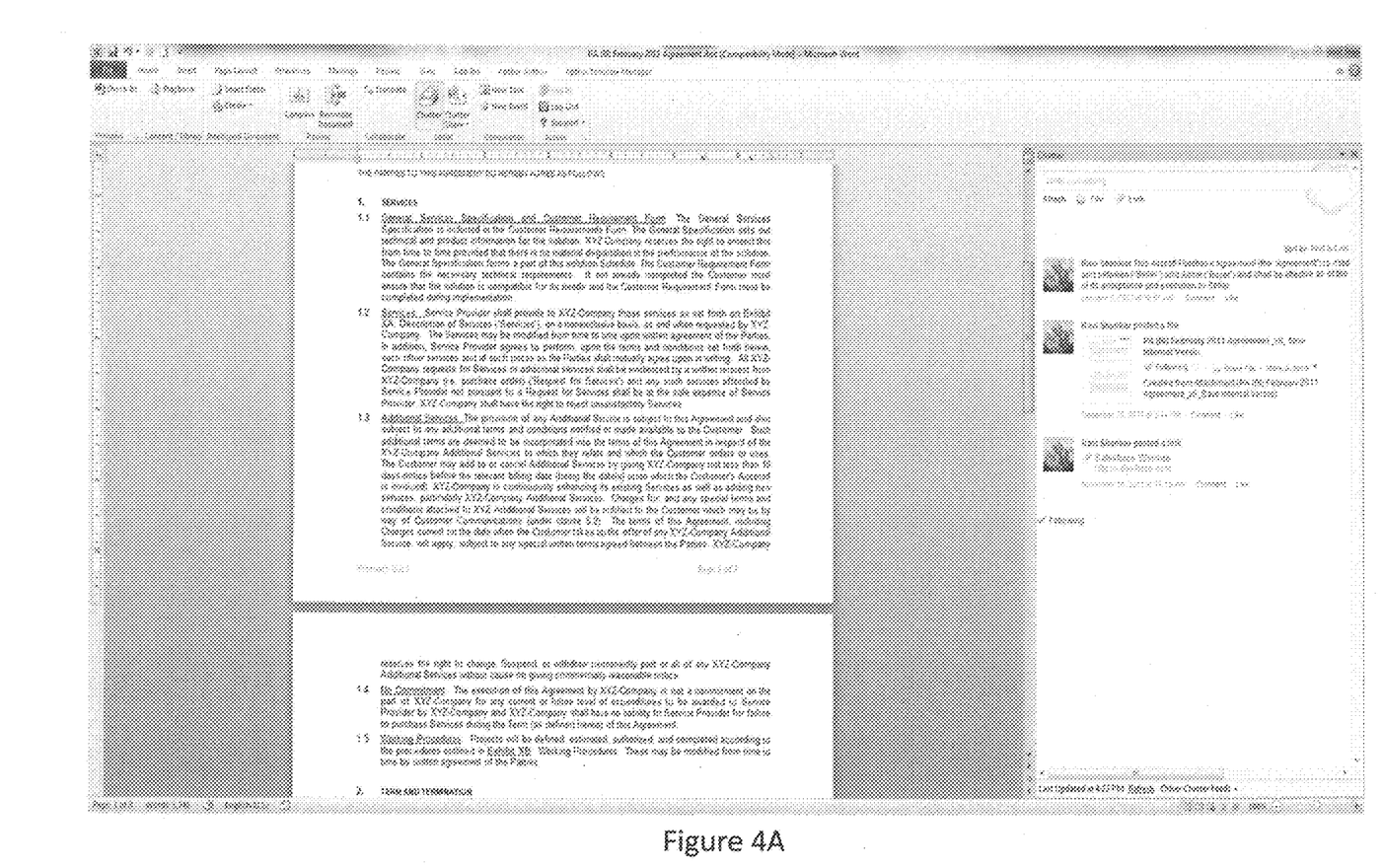
FIG. 4A illustrates an example of a word processing application with a social media feed integrated therein according to some embodiments of the invention.
Figure 4B:
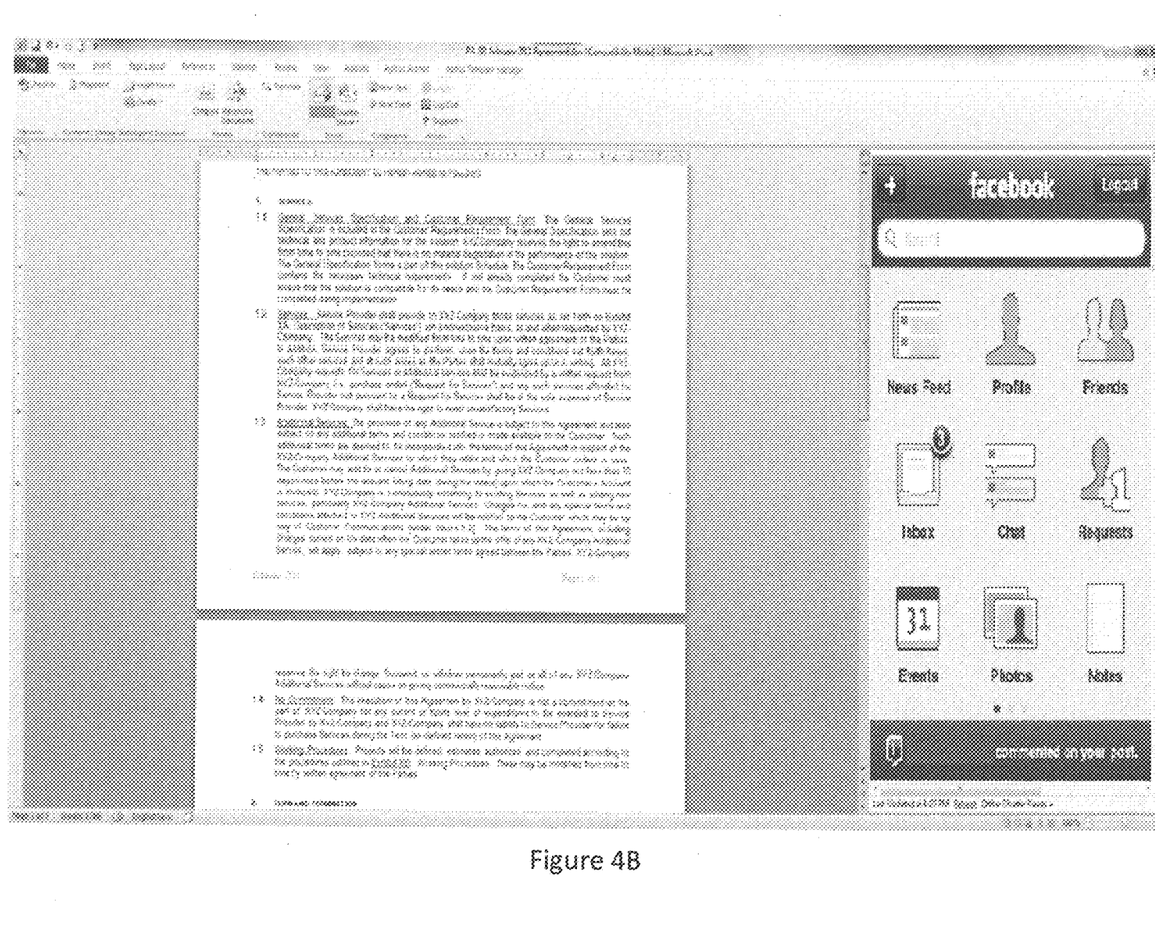
FIG. 4B illustrates an example of a word processing application with a social media feed integrated therein according to some embodiments of the invention.

FIGS. 4A and 4B illustrate examples of a word processing application with a social media feed integrated therein according to some embodiments of the invention.

In some embodiments of the invention, the social media application is configured to allow users to perform a wide variety of collaborative actions. The following is a non-exhaustive list of illustrative examples of actions that can be performed using a social media application: create user profiles; update user status; create groups of users; follow the feed of people, groups, and projects; share files; send invitations to other users; make recommendations; run reports; configure mobile devices to receive activity notifications; and configure privacy controls.

In a particularly illustrative example, the business management application 210 add-in 215 displays an information feed from the social media application into the document creation application 205 so that a user-defined group of other users can follow the document creation process. The information feed can be relevant to any object, user, project, etc. In some embodiments of the invention, the information feed is configured to follow objects such as word processing documents or sections of work processing documents.

In the presently preferred embodiments of the invention, the business management application 210 comprises a contract creation and management application and the add-in 215 displays an information feed from the social media application into a word processing application so that a user-defined group of other users can follow the contract creation process. According to these embodiments, a user can link a working contract to his information feed and ask others to review the contract or clause, make changes to the contract or clause, etc. In some embodiments of the invention, a business team can create a group information feed for one or more contract. In some embodiments of the invention, since the information feed runs on the cloud-based structured database management system 220 platform itself, the other users can actually open the contract itself to review and change, thereby allowing real-time interactive collaboration. Likewise, individual users from among the group can save changes to the document as different versions, obtain structured data to populate smart fields within a document, create and work with templates saves in the cloud, obtain relevant clauses from past documents, etc.

The users can post content from the word processing application to the feed, post comments about the content to the information feed, link Internet URLs, send private messages to other group members, create subgroups, etc.—all within the word processing application itself.

In some embodiments of the invention, the add-in 215 can switch feeds to follow another object or show multiple feeds that follow separate objects. For example, an attorney using a contract creation application via a word processing application might be assigned to a team handling only a subset of the contract clauses. According to this example, he could have separate information feeds for each of the clauses that are assigned to him.

In some embodiments of the invention, the other users can access the one or more feeds from their own document creation application 205 connected with a business management application 210 on the cloud-based structured database management system 220 via add-in 215 or via the more traditionally browser-based interface.

Figure 5A:
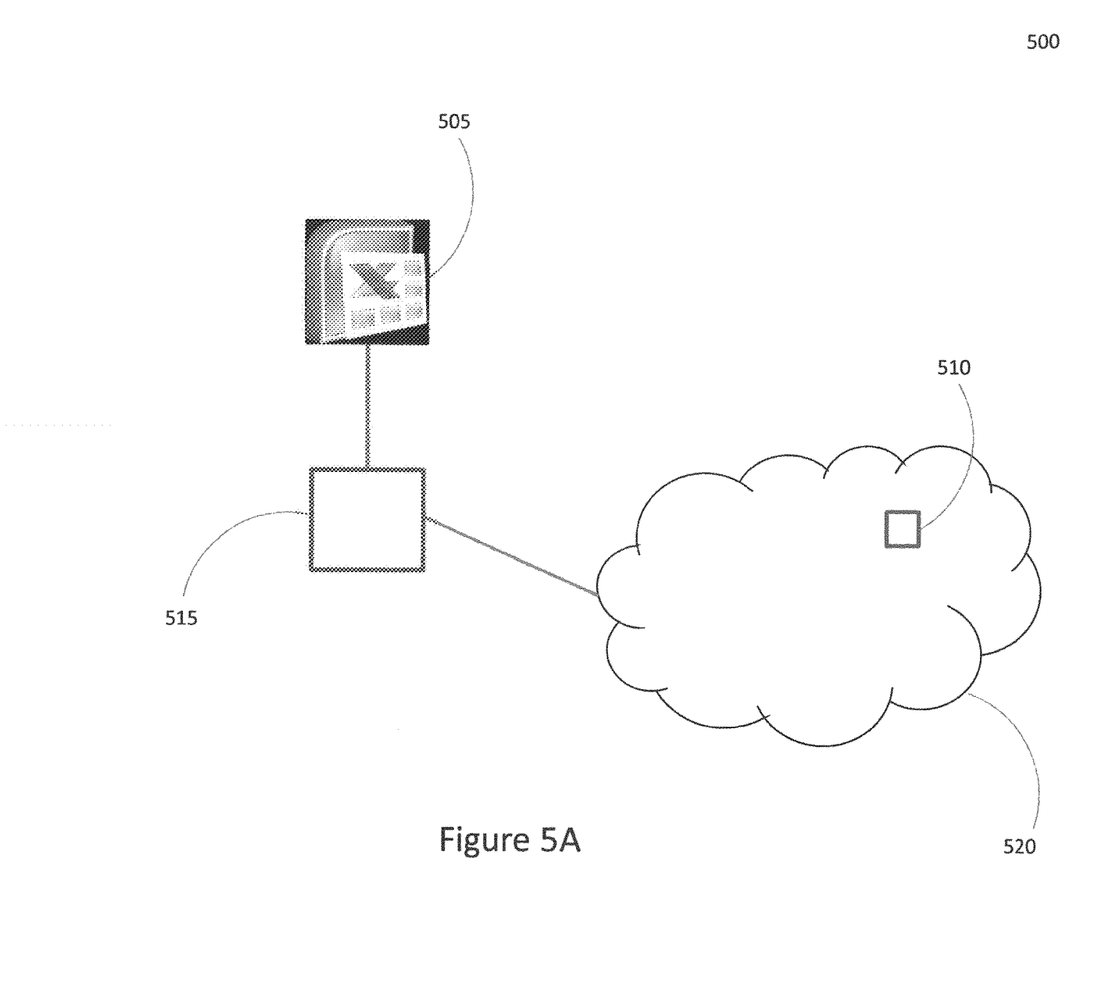
FIG. 5A illustrates a spreadsheet creation application with access to business management application according to some embodiments of the invention.

Some embodiments of the invention involve providing a spreadsheet creation application with access to business management application that is hosted on a cloud-based structured database management system or a behind the firewall application. FIG. 5A illustrates a spreadsheet creation application 505 with access to business management application 510 according to some embodiments of the invention.

In some embodiments, the business management application 510 is accessed by the spreadsheet creation application 505 through a managed add-in 515 that transfers web service calls to the spreadsheet creation application 510 via the structured database management system 520. Accordingly, a user accesses structured data from the structured database management system 520 as well as the business management application's 510 functionality via the spreadsheet creation application 505.

Figure 5B:
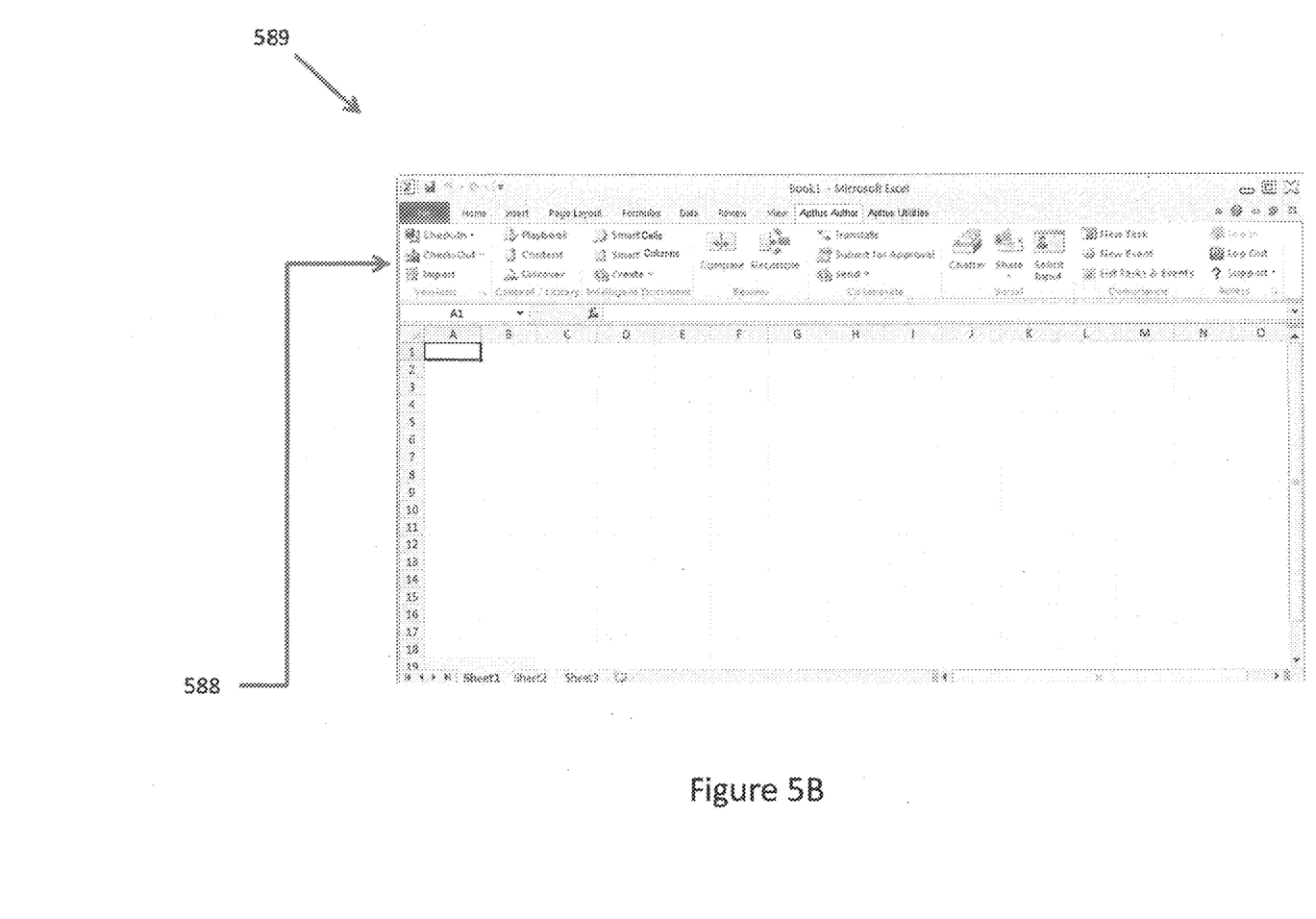
FIG. 5B illustrates an example of a spreadsheet application interface with an interactive ribbon menu for interacting with the business management application and the structured database management system via a document creation application according to some embodiments of the invention.

FIG. 5B illustrates an example of a spreadsheet application interface 599 with an interactive ribbon menu 598 for interacting with the business management application 510 and the structured database management system 520 via a document creation application 505 according to some embodiments of the invention. According to FIG. 5B, the interactive ribbon menu 598 includes a variety of tools for adding collaborative functionality and lifecycle management utility to a word processing document. For example, the tools include at least all of those disclosed above in connection with the document creation and processing application.

Figure 6:
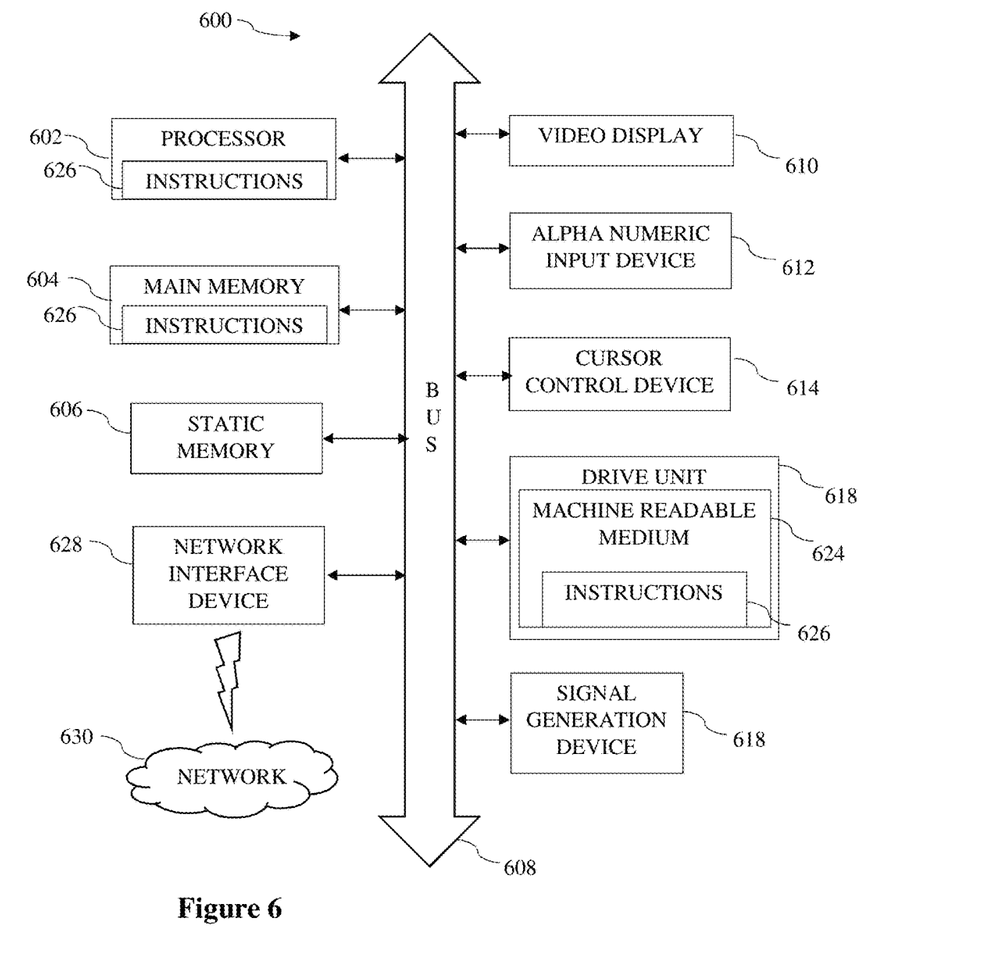
FIG. 6 is a block schematic diagram of a machine in the exemplary form of a computer system within which a set of instructions may be programmed to cause the machine to execute the logic steps of the invention.

FIG. 6 is a block schematic diagram of a machine in the exemplary form of a computer system 600 within which a set of instructions may be programmed to cause the machine to execute the logic steps of the invention. In alternative embodiments, the machine may comprise a network router, a network switch, a network bridge, personal digital assistant (PDA), a cellular telephone, a Web appliance or any machine capable of executing a sequence of instructions that specify actions to be taken by that machine.

The computer system 600 includes a processor 602, a main memory 604 and a static memory 606, which communicate with each other via a bus 608. The computer system 600 may further include a display unit 610, for example, a liquid crystal display (LCD) or a cathode ray tube (CRT). The computer system 600 also includes an alphanumeric input device 612, for example, a keyboard; a cursor control device 614, for example, a mouse; a disk drive unit 616, a signal generation device 618, for example, a speaker, and a network interface device 620.

The disk drive unit 616 includes a machine-readable medium 624 on which is stored a set of executable instructions, i.e. software, 626 embodying any one, or all, of the methodologies described herein below. The software 626 is also shown to reside, completely or at least partially, within the main memory 604 and/or within the processor 602. The software 626 may further be transmitted or received over a network 628, 630 by means of a network interface device 620.

In contrast to the system 600 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complimentary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

As will be understood by those familiar with the art, the invention may be embodied in other specific forms without departing from the spirit or essential characteristics thereof. Likewise, the particular naming and division of the members, features, attributes, and other aspects are not mandatory or significant, and the mechanisms that implement the invention or its features may have different names, divisions and/or formats. Accordingly, the disclosure of the invention is intended to be illustrative, but not limiting, of the scope of the invention, which is set forth in the claims.

The invention claimed is:

1. A computer-implemented method comprising:
in a computational device:
configuring a document creation application with an add-in comprising instructions for linking said document creation application with a business management application that runs on a platform of a structured database management system and stores datum in said structured database management system;
configuring said add-in with one or more tools that, when executed, accesses utilities of said business management application via said document creation application without leaving an interface of said document creation application, wherein said one or more tools at least comprises data linking tools comprising an executable data-pull utility that pulls datum from the structured database management system and inserts said datum into a structured field in a document open in said document creation application; and
configuring said add-in with a social network integration tool for integrating one or more social media interfaces of one or more social networks into an interface of the document creation application, wherein
said integrated one or more social media interfaces comprises media feeds including a first media feed comprising an information feed configured to follow a document open in said document creation application.

2. The computer-implemented method of claim 1, wherein said document creation application comprises a word processing application, and wherein said add-in comprises a plugin for said word processing application.

3. The computer-implemented method of claim 1, wherein said business management application comprises a business lifecycle management application configured for creating a quote for a plurality of customers, engaging and negotiating an agreement, managing customer orders, and invoicing customers.

4. The computer-implemented method of claim 1, wherein said business management application comprises a contract creation and a contract lifecycle management application.

5. The computer-implemented method of claim 1, wherein said structured database management system comprises a cloud-based structured database management system.

6. The computer-implemented method of claim 1, wherein said one or more social networks comprises a social network external to said structured database management system.

7. The computer-implemented method of claim 1, wherein said one or more social networks runs on the same platform as said structured database management system.

8. The computer-implemented method of claim 1, wherein said one or more social networks comprises a webspace of user profile pages for networking a plurality of users with each other, and wherein said plurality of users receive one or more media feeds comprising static information, multimedia information, or a combination of static information and multimedia information relating to theirs or other users' interests.

9. The computer-implemented method of claim 8, wherein said one or more social networks further comprises an interface for entering text, objects, or a combination of text and objects into, and wherein said entered text and objects are posted in said users profile page, sent to another user, displayed in one or more media feeds, or a combination thereof.

10. The computer-implemented method of claim 1, wherein said first media feed includes information relating to the document as a whole.

11. The computer-implemented method of claim 1, wherein said media feeds further includes at least one additional media feed, wherein said user can switch views between the first media feed, the at least one additional media feed, and a combination view of the first media feed and the at least one additional media feed.

12. A system comprising:
a non-transitory machine readable medium; and instructions carried by the machine-readable medium and operable to cause a programmable processor to perform:

configuring a document creation application with an add-in comprising instructions for linking said word processing application with a business management application that runs on a platform of a structured database management system and stores datum in said structured database management system;

configuring said add-in with one or more tools that, when executed, accesses utilities of said business management application via said document creation application without leaving an interface of said document creation application, wherein said one or more tools at least comprises data linking tools comprising an executable data-pull utility that pulls datum from the structured database management system and inserts said datum into a structured field in a document in said document creation application; and configuring said add-in with a social network integration tool for integrating one or more social media interfaces of one or more social network into an interface of the document creation application, wherein said integrated one or more social media interfaces comprises media feeds including a first media feed comprising an information feed configured to follow a document open in said document creation application.

13. The system of claim 12, wherein said business management application comprises one of:
a business lifecycle management application configured for creating a quote for a plurality of customers, engaging and negotiating an agreement, managing customer orders, and invoicing customers;
a contract creation and contract lifecycle management application; and a business management suite comprising a business lifecycle management application configured for creating a quote for a plurality of customers, engaging and negotiating an agreement, managing customer orders, and invoicing customers and a contract creation and contract lifecycle management application.

14. The system of claim 13, wherein said structured database management system comprises a cloud-based structured database management system.

15. The system of claim 14, wherein said one or more social network comprises a social network external to said structured database management system.

16. The system of claim 15, wherein said one or more social network comprises runs on the same platform as said structured database management system.

17. The system of claim 16, wherein said one or more social network comprises:
a webspace of user profile pages for networking a plurality of users with each other, and wherein said plurality of users receive one or more media feeds comprising static information, multimedia information, or a combination of static information and multimedia information relating to theirs or other users' interests, and
an interface for entering text, objects, or a combination of text and objects into, and wherein said entered text and objects are posted in said users profile page, sent to another user, displayed in one or more media feeds, or a combination thereof.

18. The system of claim 12, wherein said first media feed further comprises one of:
information relating to the document as a whole;
information relating to a selected portion of text in a document open in said document creation application.

19. The system of claim 12, wherein said first media feed further comprises a combination of information relating to the document open in said document creation application, information relating to the document as a whole, and information relating to a selected portion of text in the document open in said document creation application.

20. The system of claim 12, wherein media feeds further includes at least one additional media feed, wherein said user can switch views between the first media feed, the at least one additional media feed and a combination view of the first media feed and the at least one additional media feed.

* * * * *